United States Patent [19]

Harry

[11] Patent Number: 4,841,621
[45] Date of Patent: Jun. 27, 1989

[54] SHAFT ADJUSTER

[75] Inventor: Herbert H. Harry, Los Alamos, N. Mex.

[73] Assignee: The United States of America as represented by The United States Department of Energy, Washington, D.C.

[21] Appl. No.: 167,206

[22] Filed: Mar. 11, 1988

[51] Int. Cl.$^4$ .............................................. B23Q 3/18
[52] U.S. Cl. ....................................... 29/464; 403/86; 403/160; 464/170
[58] Field of Search .................... 29/434, 464; 403/86, 403/160, DIG. 8; 464/170, 185

[56] References Cited

U.S. PATENT DOCUMENTS 2,926,032 2/1960 Cook ........................................ 403/86
2,985,474 5/1961 Cook ........................................ 403/86

Primary Examiner—Timothy V. Eley
Assistant Examiner—Frances Chin
Attorney, Agent, or Firm—Milton D. Wyrick; Paul D. Gaetjens; Judson R. Hightower

[57] ABSTRACT

Apparatus and method for the adjustment and alignment of shafts in high power devices. A plurality of adjacent rotatable angled cylinders are positioned between a base and the shaft to be aligned which when rotated introduce an axial offset. The apparatus is electrically conductive and constructed of a structurally rigid material. The angled cylinders allow the shaft such as the center conductor in a pulse line machine to be offset in any desired alignment position within the range of the apparatus.

3 Claims, 3 Drawing Sheets

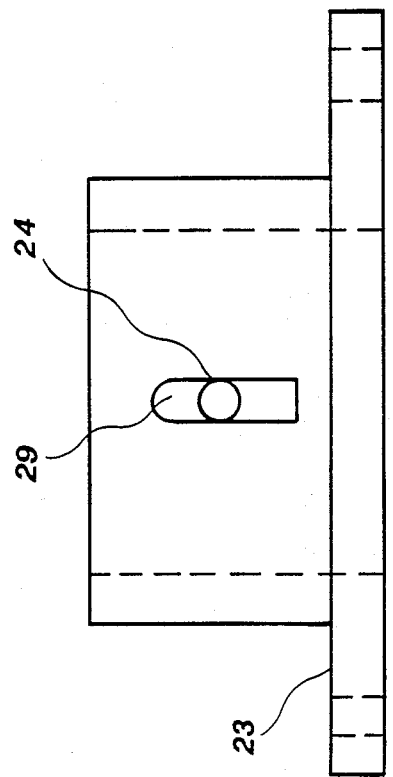

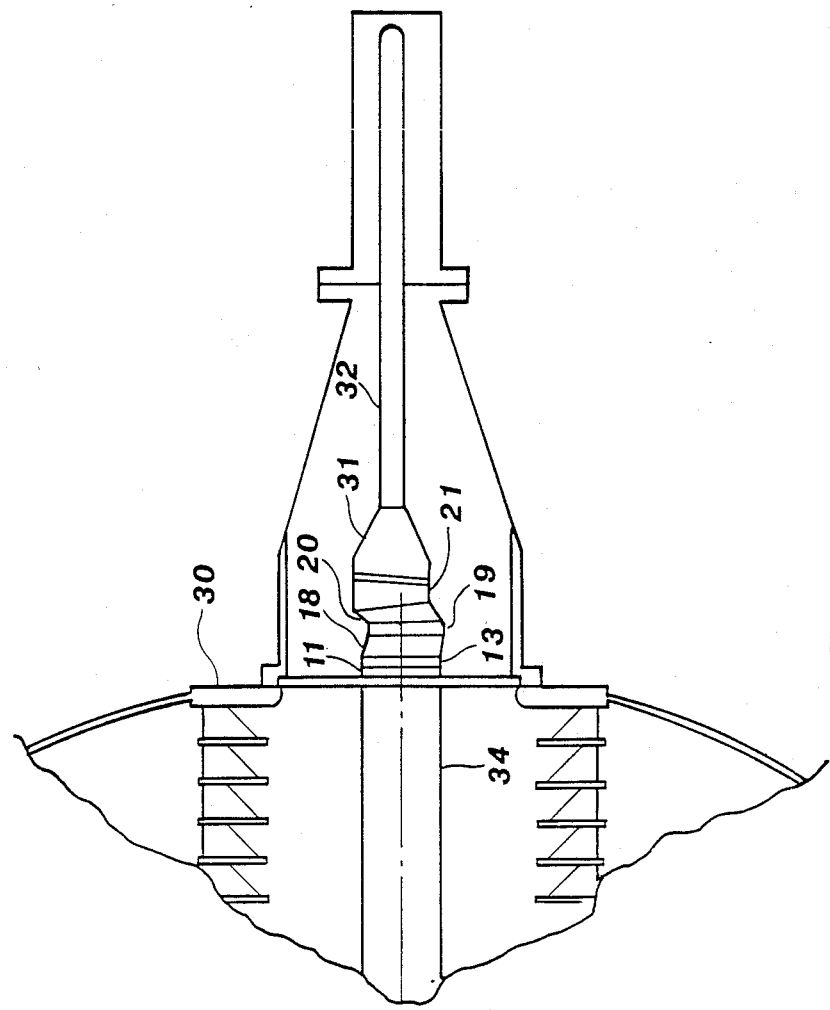

SHAFT ADJUSTER

The invention is a result of a contract with the Department of Energy (Contract No. W-7405-ENG-36).

BACKGROUND OF THE INVENTION

This invention relates generally to high power systems, and, more specifically, to the alignment of the center conductor of a pulse power system.

High power devices which require properly aligned shafts or center conductors for their operation have in the past had to rely on relatively crude methods to correct alignment when factors such as temperature and pressure cause misalignment. In most cases, this realignment is accomplished by shimming. However, shimming of a long, heavy shaft or center conductor requires considerable manpower, and results in long periods of down time of the associated equipment.

In the case of pulse power equipment, the long center conductor must stay properly centered in its enclosure in order for the equipment to function in the correct manner. Center conductors which are misaligned may result in erroneous test results, and even in damage to equipment. The length and weight of the center conductor cause it to require frequent realignment, and make such realignment difficult.

In the past, the usual method of maintaining the alignment of a long, heavy conductor was to insert metal shims at the base of the conductor. This imprecise technique exacts a high cost in both manpower and downtime of equipmment. Another method, which has been useful for adjusting light loads, is a cupped base member which allows a rounded member to rotate within its cupped area. The main problem with this type device is that it is incapable of supporting a long or heavy load.

It is therefore an object of the present invention to provide a shaft adjuster having the mechanical strength to support long and heavy loads.

It is a further object of the present invention to provide a shaft adjuster which will allow the precise alignment of shafts with a minimum of manpower and downtime of equipment.

It is a further object of the present invention to provide a shaft adjuster that is capable of conducting large quantities of electrical current.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, apparatus for providing precise adjustment of the alignment of shafts extending from a base may comprise a plurality of adjacent rotatable angled cylinders interposed between said base and said shaft effective to produce an axial offset between said base and said shaft, the angled cylinders comprising an electrically conductive and structurally rigid material.

In a further aspect of the present invention and in accordance with its principles, a method of aligning a shaft extending from a base, comprising mounting a plurality of electrically conductive cylinders, having angled faces in slidable contact with each other, between the base and the shaft. One or more of the cylinders is rotated until the shaft is in predetermined alignment. Finally, the cylinders are axially tightened to maintain the shaft in the predetermined alignment.

BRIEF DESCRIPTION OF THE DRAWINGS

The accompanying drawings, which are incorporated in and form a part of the specification, illustrate an embodiment of the present invention, and, together with the description, serve to explain the principles of the invention. In the drawings:

FIG. 2 is a top view of the unthreaded spanner nut retainer of the present invention.

FIG. 3 is a side view of an embodiment of the present invention installed at the base of a center conductor in a cutaway view of a pulse line machine.

DETAILED DESCRIPTION OF THE INVENTION

Figure 1:
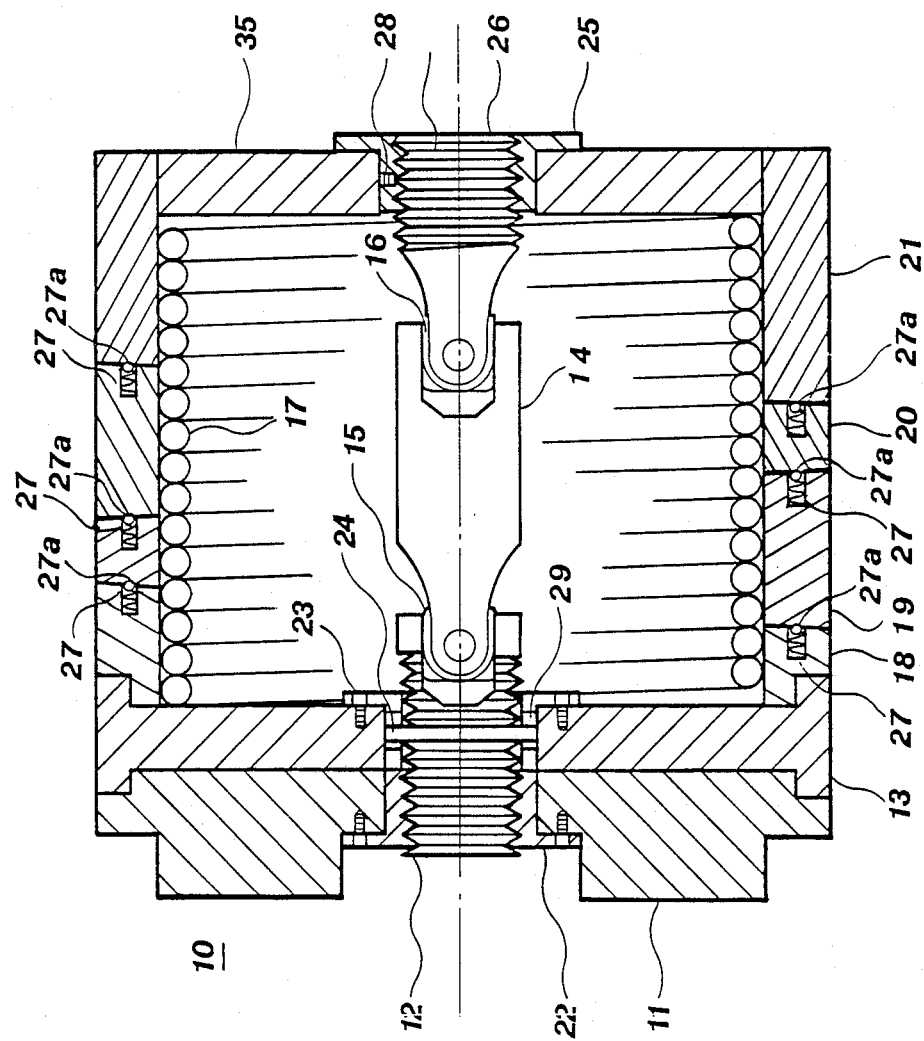
FIG. 1 is a cross-sectional view of an embodiment of the shaft adjuster.

In brief, the present invention is an apparatus and method for aligning shafts in high power systems, such as the center conductor in pulse power equipment. The present invention accomplishes this alignment by introducing an offset through rotation of adjacent angled cylinders. The apparatus is constructed of an electrically conductive and structurally rigid material so that it is capable of carrying large electrical currents and supporting heavy loads.

Reference will now be made to one embodiment of the present invention, an example of which is illustrated in the accompanying drawings. Turning first to FIG. 1, there can be seen a cross-sectional view of shaft adjuster 10 which is constructed of an electrically conductive and structurally rigid material, such as stainless steel. As seen, axial pin 14 connects to threaded connectors 12, 26 through U-joints 15, 16. Axial pin 14 maintains a desired angular offset of shaft adjuster 10. U-joints 15, 16 allow axial pin 14 to conform to any angular offset, within the predetermined range of shaft adjuster 10, while also allowing pin 14 to provide the force necessary to maintain a predetermined orientation of shaft adjuster 10.

The outer body of shaft adjuster 10 comprises mounting ring 11, spanner nut 13, and angled cylinders 18, 19, 20, and 21, each of which have one or more faces cut at an angle with respect to vertical. Angled cylinder 18 interfaces with spanner nut 13 on one side, and has the opposite face cut at an angle effective to introduce an offset when rotated about its axis. Angled cylinders 19, 20 have both faces cut at angles, while angled cylinder 21 has only its face which is adjacent to angled cylinder 20 cut at an angle. The opposite face of angled cylinder 21 is not angled, but is fixed to annular plate 35. It is the rotation of angled cylinders 18, 19, 20, and 21 that introduces the axial offset needed to align shafts, and it is the compressive force applied by axial pin 14 that maintains the axial offset.

Threaded connector 12 passes through unthreaded spanner nut retainer 23, which is fixed to spanner nut 13 with screws. Threaded connector 12 further is threaded through mounting ring retainer 22, which is also fixed to mounting ring 11 with screws. Mounting ring 11 is fixedly attached to the base of the shaft (not shown), while threaded connector 12 connects to a mating connection (not shown) on the shaft. Threaded connector 12 is prevented from rotation within spanner nut retainer 23 by rigid pin 24, which passes through longitudinal slot 29 in spanner nut retainer 23 and an aperture in threaded connector 12.

Angled cylinders 18, 19, 20, and 21 can be relatively rotated to achieve a desired offset after spanner nut 13 is rotated, unscrewing threaded connector 12 from its connection at the base of the shaft. This allows axial pin 14 to relax slightly, and spanner nut 13 to be moved a small distance toward mounting ring 11. While axial pin 14 is in a loosened condition, restraining coil 17 maintains the position of angled cylinders 18, 19, 20, and 21, allowing them to be easily rotated. After the desired offset is attained, spanner nut 13 is used to screw threaded connector 12 back onto the connection at the base of the shaft (not shown), thereby retightening axial pin 14.

At the opposite end of shaft adjuster 10, threaded connector 26 connects to axial pin 14 through U-joint 16, and is threaded through front retainer 25 to connect with a mating connection (not shown) on the shaft to be adjusted. Threaded connector 26 is prevented from rotating within front retainer 25 by set screw 28 which passes through front retainer 25.

The offset which allows the adjustment of shafts is introduced by the series of angled cylinders 18, 19, 20, and 21, which, when rotated, will offset the axis through adjuster 10. Angled cylinders 18, 19, and 20 each contain numerous circumferentially located spring loaded ball detents 27 on one face which mate with a like number of mating recesses 27a in the adjacent faces of angled cylinders 19, 20, and 21. Ball detents 27 assist in maintaining a desired orientation of cylinders 18, 19, 20, and 21.

Angled cylinders 18, 19, 20, and 21 may be rotated to attain a desired offset when spanner nut 13 is loosened by unscrewing threaded connector 12 from its mating connector at the base of a shaft. With spanner nut 13 loosened, angled cylinders 18, 19, 20, and 21 are maintained in position by restraining coil 17, and can be rotated through ball detents 27 to obtain the desired offset. After achieving the desired offset, angled cylinders 18, 19, 20, and 21 are tightened into a fixed position by screwing spanner nut 13 back onto its mating connector. This action also tightens axial pin 14, pulling angled cylinders 18, 19, 20, and 21 into firm contact with each other.

Restraining coil 17 may comprise almost any material that may be coiled into a spring. In pulse power applications, it is best that restraining coil 17 be constructed of a dielectric material. In one embodiment, a coil of nylon tubing is utilized.

Referring now to FIG. 2, there is shown a top view of spanner nut retainer 23 with longitudinal slot 29 in its cylindrical portion. Located within slot 29 is rigid pin 24 which also passes through threaded connector 12 (FIG. 1) to prevent rotation of threaded connector 12 within spanner nut retainer 23 when the apparatus is being loosened. It is clear in this view that spanner nut retainer 23 is not threaded in order that threaded connector 12 can move freely through retainer 23 subject to the constraint of pin 24 in slot 29.

In FIG. 3, one embodiment of the present invention is seen installed at the end of a diode stack between center conductor section 34 and center conductor section 32, in a cutaway side view of pulse line machine 30. As seen, mounting cylinder 11 is attached to center conductor section 34, and angled cylinder 21 is adjacent to center conductor adaptor 31, the connection being made through threaded connector 26 (FIG. 1). With spanner nut 13 unscrewed slightly, cylinders 18, 19, 20, and 21 are rotated until the proper alignment of center conductor section 32 is achieved. When alignment is set, spanner nut 13 is tightened to maintain the position of cylinders 18, 19, 20, and 21, and of center conductor section 32 through the action of axial pin 14 (FIG. 1). It should be noted that shaft adjuster 10 is capable of introducing any desired two dimensional offset within the angular range of cylinders 18, 19, 20, and 21.

The foregoing description of embodiments of the present invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for adjusting the axial alignment of a shaft extending from a base in a high power device comprising:
   a plurality of adjacent rotatable cylinders having substantially equal diameters and angled faces interposed between said base and said shaft effective to produce an axial offset between said base and said shaft, said cylinders comprising an electrically conductive and structurally rigid material;
   pin means attached to said base and to said shaft and axially located with respect to said cylinders for maintaining said angled faces of said cylinders in releasable sliding contact; and
   coiled spring means disposed within said plurality of cylinders for stabilizing said plurality of cylinders when contact between adjacent ones of said plurality of cylinders is released by said pin means.

2. The apparatus as described in claim 1, wherein said coiled spring means comprises a dielectric material.

3. The apparatus as described in claim 1, wherein said plurality of cylinders further comprises a plurality of ball detents in one said face of one or more of said cylinders, said ball detents mating with alike plurality of hemispherical recesses in adjacent said faces of adjacent said cylinders.

* * * * *